United States Patent
Van Der Linde (10) Patent No.: US 10,479,002 B2
(45) Date of Patent: Nov. 19, 2019

(54) MOLDING TOOLS AND METHOD WITH GRIP-ENHANCING STRUCTURE

(71) Applicant: OLBRICH GmbH, Bocholt (DE)

(72) Inventor: Albert Van Der Linde, Bocholt (DE)

(73) Assignee: OLBRICH GMBH, Bocholt (DE)

( * ) Notice: Subject to any disclaimer, the term of this patent is extended or adjusted under 35 U.S.C. 154(b) by 270 days.

(21) Appl. No.: 15/396,999

(22) Filed: Jan. 3, 2017

(65) Prior Publication Data

US 2017/0190079 A1 Jul. 6, 2017

(30) Foreign Application Priority Data

Jan. 6, 2016 (DE) .................... 20 2016 000 052 U (51) Int. Cl.
*B29C 43/36* (2006.01)
*B29L 31/30* (2006.01)

(52) U.S. Cl.
CPC ....... *B29C 43/36* (2013.01); *B29L 2031/3041* (2013.01)

(58) Field of Classification Search
CPC . B29C 43/36; B29C 2043/3602; B30B 15/02; B30B 15/08; B30B 15/026; B30B 15/028; B30B 15/06; B30B 15/062; B29L 2031/3041
See application file for complete search history.

(56) References Cited

U.S. PATENT DOCUMENTS

| 4,923,539 A | 5/1990 | Spengler et al. |
| 4,986,940 A | 1/1991 | Komiya et al. |
| 4,986,948 A * | 1/1991 | Komiya ............. B29C 43/3607 264/257 |
| 5,076,880 A | 12/1991 | Spengler et al. |
| 5,223,201 A | 6/1993 | Masui et al. |

(Continued)

FOREIGN PATENT DOCUMENTS

| DE | 102011102031 A1 * | 11/2012 | ......... B29C 45/1418 |
| DE | 202013005670 | 7/2013 | |

(Continued)

*Primary Examiner* — Anthony Calandra
*Assistant Examiner* — Jamel M Nelson
(74) *Attorney, Agent, or Firm* — W. F. Fasse (57) ABSTRACT

A molding apparatus includes two mold tools that define and bound a mold cavity therebetween, for three-dimensionally press-molding a trim component. To minimize or avoid shrinkage or pull-back recession of the edge of the trim component during the molding process, at least one of the mold tools, on its molding surface bounding an end portion of the mold cavity, includes at least one grip-enhancing structure that provides increased grip on an edge portion of the trim component. The grip-enhancing structure may be or include a rough surface, a geometric configured surface, a geometric gripping edge, a surface coating, or mechanical engagement members. The grip-enhancing structure provides increased grip on the edge portion of the trim component by narrowing the mold cavity space, by increasing the surface friction or adhesion, and/or by mechanically engaging the material of the trim component. Thereby, the edge of the trim component is held in place while the three-dimensional molding proceeds and until the molded contour of the component is fixed.

22 Claims, 2 Drawing Sheets

(56) References Cited

U.S. PATENT DOCUMENTS

| | | |
|---|---|---|
| 5,413,661 A | 5/1995 | Spengler et al. |
| 5,415,536 A | 5/1995 | Ohno |
| 6,136,415 A | 10/2000 | Spengler |
| 6,214,157 B1 | 4/2001 | Spengler |
| 6,524,510 B2 | 2/2003 | Spengler |
| 6,887,413 B1 | 5/2005 | Schumacher |
| 7,101,503 B2 | 9/2006 | Spengler et al. |
| 7,699,595 B2 | 4/2010 | Spengler |
| 8,197,740 B2 | 6/2012 | Spengler |

FOREIGN PATENT DOCUMENTS

| | | |
|---|---|---|
| DE | 102014217173 | 3/2016 |
| EP | 0 272 635 | 6/1988 |
| EP | 0 433 857 | 6/1991 |
| JP | 08-156023 A | 6/1996 |
| JP | 2009-113548 A | 5/2009 |
| JP | 2010-274636 A | 12/2010 |

* cited by examiner

MOLDING TOOLS AND METHOD WITH GRIP-ENHANCING STRUCTURE

FIELD OF THE INVENTION

The invention relates to molding tools and a method for forming a molded trim component with reduced slippage, shrinkage, pull-back or retraction of an edge of the trim component material during the molding thereof.

PRIORITY CLAIM

This application is based on and claims the foreign priority under 35 USC 119 of German Utility Model Application DE 20 2016 000 052.8 filed on Jan. 6, 2016, the entire disclosure of which is incorporated herein by reference.

BACKGROUND INFORMATION

Trim components such as trim panels are typically used for covering and finishing the interior passenger cabins of automobiles, aircraft, rail vehicles, etc. as well as luggage areas and some external areas of such vehicles. For example, in automotive applications such trim components include headliners, door liners, armrest pads, storage bins, consoles, dashboard covers, load floors, package trays, pillar covers, trunk liners, carpeted floor liners, engine hood covers, wheel well liners, etc.

Such trim components typically are produced as single-layer or multi-layer press-molded and thermoformed components of composite materials, which may include natural and/or synthetic fibers of organic and inorganic basis, as well as a synthetic plastic binder of a thermoplastic or thermosetting character. It is known to fabricate such trim components from a great variety of different materials providing different required functional properties, such as a visually attractive and esthetically pleasing surface covering that is also comfortable to the touch, as well as providing thermal and/or acoustic insulation, absorption and damping. Typically, a trim component such as a trim panel includes a cover layer (also known as a "decor" layer) laminated onto a substrate, whereby the cover layer provides the visible or exposed face side of the trim component, and the substrate forms the mounting surface or back side of the trim component and provides the required structural strength and three-dimensional form of the component. One or more additional layers, such as foam padding and thermal or acoustic insulation layers, may be laminated between the cover layer and the substrate. The substrate may be made of various materials, for example synthetic plastic, fiber board stock including wood fibers or other natural fibers embedded in plastic resin, fiberglass, or a hybrid composite including natural fibers together with synthetic plastic fibers. The plastic materials may include thermoplastic and/or thermoset materials. The cover layer may be made of decorative woven or non-woven fabric, fleece, natural leather, imitation leather, carpet, or vinyl or other plastic sheet materials, preferably bonded to a backing of a foam material.

Various methods are known for press-molding such trim components. For example, a sheet of the substrate material, a sheet of the cover layer material, and one or more sheets of any intermediate layers are stacked to form a sandwich structure, which is then heated, laminated together, compressed, and pre-calibrated to a particular thickness between parallel planar press plates, which may be heated to a suitable temperature so as to heat and thereby melt or soften thermoplastic materials and/or activate and accelerate a chemical thermosetting reaction of thermoset materials of the component layers. With or without such an optional pre-laminating and pressing step, the stack of material layers is placed between a three-dimensionally contoured lower mold and a three-dimensionally contoured upper mold of a molding press. One of the molds is typically a female or cavity mold tool and the other mold is typically a male or core mold tool that mates with the female or cavity mold tool to form a molding cavity gap therebetween, in which the trim component material layers are to be pressed and molded to the three-dimensional contoured shape of the mold tools. The upper and lower molds are closed relative to one another, and thereby the layered sandwich structure is further laminated, compressed and three-dimensionally molded, under the effects of heat and pressure between the contoured upper and lower molds. Generally in this regard, the cover layer and substrate materials are thermoformable, i.e. so that they may be heated to a softening or molding temperature, then molded into a desired three-dimensionally contoured shape, and then cooled to "freeze" included thermoplastic materials, or to chemically set included thermosetting materials, to become rigid and maintain the molded contoured shape.

The mold tools typically further include a pair of cooperating bypass cutting edges, or a pinch edge that cooperates with a counter surface on the other mold tool, by which an edge of the trim component is bypass-cut, or stamp-cut or pinched, respectively when the mold tools close relative to one another. Forming an exact or precise trimmed edge of the trim component, perpendicularly to the local surface of the molding tool, along the perimeter of the trim component is extremely important for the appropriate fit, finish and appearance of the trim component in its final installed application. However, due to tolerances and misalignments that can arise during the laminating and molding process, and due to the stretching and three-dimensional molding deformation of the cover layer and the substrate during the molding process, the various layers of the trim component may stretch, shrink, retract or pull-back by differing extents at the edge of the trim component. Particularly, due to different stretching and retraction characteristics of the materials, in some cases the edge of the visible surface cover layer and/or the edge of the back side substrate layer may pull-back or retract away from the intended edge position during the molding process. Such shrinkage or pull-back can arise perpendicularly or also diagonally or obliquely relative to the cross-section of the component. Such variable shrinkage, retraction or pull-back of the edge of one or more layers of the component is unacceptable and can lead to a finished trim component being rejected due to unacceptable edge quality, therefore leading to increased waste and lower yield of the production process.

SUMMARY OF THE INVENTION

In view of the above, it is an object of at least certain embodiments of the present invention to provide an apparatus and a method for forming a trim component in a manner whereby the slipping, shrinkage, pull-back or retraction of the edge of the trim component during the molding process thereof is reduced, minimized or entirely prevented. More particularly, it is an object of at least certain embodiments of the invention to form a cut edge of the trim component during the molding process, and also provide increased gripping or holding of an edge portion of the trim component during the molding process to reduce or prevent a pull-back or retraction of the cut edge during the molding process. Another object of at least certain embodiments of the invention is to ensure that at least the visible surface of the front face of the trim component is not damaged or visibly harmed in any way during the molding process while reducing or preventing pull-back or retraction of the edge. Further particularly, it is an object of at least certain embodiments of the invention to increase the gripping or holding of the edge portion of the trim component in the mold cavity during the molding process, and to hold-down the edge portion of the trim component during the molding process, in order to reduce or prevent the edge retraction. More generally, an object of at least certain embodiments of the present invention is to produce a molded trim component of which the edge at a perimeter thereof is fixed and maintained at the proper designed location thereof after the trim component is removed from the molding tools, so that the trim component edge has its nominal or designed position and shape on the finished trim component. A further object of at least certain embodiments of the invention is to reduce the amount of waste material by reducing the amount of excess material that would otherwise be required along the edge of the raw material layers to allow for shrinkage or pull-back retraction thereof during the molding process. The invention further aims to avoid or overcome the disadvantages of the prior art, and to achieve additional advantages, as apparent from the present specification. The attainment of these objects is, however, not a required limitation of the claimed invention.

The above objects can be achieved in at least some of the embodiments according to the invention in a molding apparatus with first and second mold tools, wherein at least one of these mold tools includes a grip-enhancing structure that provides an increased grip or holding of an edge portion of the trim component in the mold cavity gap formed between the first and second mold tools during the molding process. In this regard, the grip-enhancing structure provides a higher coefficient of friction, a higher surface adhesion, a narrowing of the mold cavity gap, and/or an increased mechanical engagement of the edge portion of the trim component in an end portion of the mold cavity, in comparison to an adjoining portion of the mold tool surfaces bounding the mold cavity therebetween. In various embodiments, the grip-enhancing structure may comprise a rough surface, a geometric configured surface such as an embossed, patterned or knurled surface, a geometric gripping edge, a structure of needles, pins or pegs, and/or a surface coating of a higher-friction or higher-adhesion material on the mold tool surface. The grip-enhancing structure serves to hold the edge portion of the trim component in place and reduce or prevent retraction slipping thereof during the molding process in the mold cavity formed between the two mold tools.

In a particular embodiment, the grip-enhancing structure is provided only on one mold tool, for example on the female cavity mold tool, or on the male die or core mold tool, while the opposite facing surface of the other mold tool is a plain flat or smooth mold tool surface without a grip-enhancing structure. Alternatively, in another embodiment, the grip-enhancing structures may be provided on both mold tools, wherein the same configuration of grip-enhancing structure may be provided on both mold tools, or different configurations of grip-enhancing structures may respectively be provided on the two mold tools. Different "configurations" of grip-enhancing structures means different types, dimensions, shapes, roughness values, friction values, and/or adhesiveness values, etc. Also in this regard, the respective different grip-enhancing structures on the two mold tools may mate or mesh with one another, e.g. ridges of one mold tool may mesh or mate with grooves of the other mold tool, in order to better mechanically engage the edge portion of the trim component therebetween and/or so as to narrow the mold cavity space therebetween.

The grip-enhancing structure or structures in one embodiment are provided continuously around an entire perimeter of the mold cavity on one or both mold tools. In another embodiment, one or more grip-enhancing structures are provided only at discrete locations forming one or more portions of the perimeter of the mold cavity. The one or more grip-enhancing structures in one embodiment are fixed permanent components of the respective mold tool, and in another embodiment are provided respectively on one or more removable and exchangeable mold edge segments that are removably secured (for example bolted) to a main mold tool body. In this manner, different particular configurations or embodiments of the grip-enhancing structures can be provided economically for different molding requirements, for example for different materials or different material combinations of a respective trim component being molded, while the main mold tool body of each mold tool may be used generically for various different molding runs. Also, different configurations of grip-enhancing structures may thereby be provided at different locations along the perimeter of the edge of the mold cavity, depending on the local pull-back or retraction characteristics of the edge portion of the trim component at that location respectively during the molding process.

The above objects can further be achieved in at least certain embodiments of the invention, in a method of molding a trim component that involves gripping or holding an edge portion of the trim component during the molding process so as to reduce or prevent the pull-back or retraction of the edge from the intended, nominal or designed position thereof during the molding process, so that the finished trim component has the intended nominal or designed location and configuration of the edge thereof after completion of the molding process.

Further details of various embodiments of the invention are set forth in the following description, claims and drawings.

BRIEF DESCRIPTION OF THE DRAWINGS

In order that the invention may be clearly understood, it will now be described in further detail with reference to the accompanying drawings, wherein.

DETAILED DESCRIPTION OF PREFERRED EXAMPLE EMBODIMENTS OF THE INVENTION

The drawings merely schematically illustrate a few components and only a small portion of an overall complete molding apparatus according to several different embodiments of the invention. Particularly, the drawings illustrate only portions of upper and lower mold tools. This limited schematic illustration is sufficient to enable a person of ordinary skill in the art to practice the invention, because other non-illustrated components and portions of such a molding apparatus are conventionally known or understood. For example, a person of ordinary skill readily understands that the molding apparatus includes additional components and devices that are not, and do not need to be, illustrated; such as heating devices, cooling devices, material carrying frames, material transport conveyors, actuators, controls, machine frames or supports, etc. Such additional devices and components can be embodied, configured and arranged in any conventionally known or understood manner. For example, a person of ordinary skill readily understands that the molding apparatus comprises actuators and controllers configured and arranged to move the mold tools in the manner described herein, even though these additional auxiliary devices (e.g. actuators and controllers) are not illustrated or described. The actuators for moving the mold components in the described manner may comprise hydraulic piston-cylinder devices, pneumatic piston-cylinder devices, motor-driven acme screw shafts, inflatable hose drives, cam drives, scissors drives, and/or any other known drive arrangements.

Figure 2:
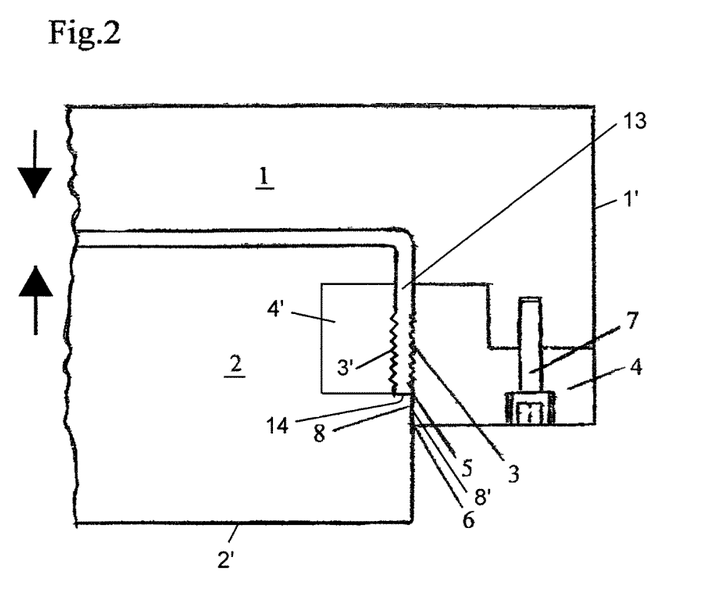
FIG. 2 is a schematic sectional view on a vertical section plane of a portion of a molding apparatus including the upper mold tool according to FIG. 1 and a cooperating lower mold tool.

FIG. 2 shows an upper mold tool 1 and a lower mold tool 2 that cooperate with one another to press-mold and thermoform a trim component in the mold cavity gap 13 formed between the two mold tools. More particularly, in this example, the upper mold tool (or first mold tool) is a female cavity mold, while the lower mold tool 2 (or second mold tool) is a male core mold that matingly fits into the recessed cavity of the upper mold tool 1, so as to form the mold cavity gap 13 therebetween when the mold tools have been closed relative to each other. For this purpose, the mold tools 1 and 2 are relatively movable vertically toward and away from one another. The mold tools 1 and 2 begin a molding cycle in an open position in which the mold tools 1 and 2 are moved apart from one another, and the required material layer or layers for the trim component are introduced between the mold tools 1 and 2. Then the mold tools are moved vertically relatively toward one another (e.g. the lower mold tool 2 is moved upwardly and/or the upper mold tool 1 is moved downwardly) as indicated by the heavy direction arrows in FIG. 2, to close the mold to the closed position shown in FIG. 2, in which the mold cavity gap 13 is formed between the juxtaposed first and second molding surfaces of the first and second mold tools 1 and 2 respectively.

During the closing of the mold tools (before reaching the closed position shown in FIG. 2), a protruding excess waste portion of the trim component material that protrudes out of the mold cavity gap 13 is cut off by a bypass cutting action of an upper or first bypass cutting edge 6 provided on the upper mold tool 1 closely shearing and passing by a lower or second bypass cutting edge 5 provided on the lower mold tool 2, as the lower mold tool 2 moves into the molding cavity or recess of the upper mold tool 1.

The upper mold tool 1 further includes a bypass surface 8 directly adjoining and running along the bypass cutting edge 6. The lower mold 2 includes a similar bypass surface 8' that contacts, slides along, and overlaps the bypass surface 8 as the lower mold tool 2 moves farther upwardly into the molding cavity of the upper mold tool 1 after the bypass cutting edges 5 and 6 have sheared past one another and cut-off the excess waste portion of the trim component material. These overlapping bypass surfaces 8 and 8' have a conventionally smooth metal finish of the metal material of the mold tools to provide a sufficiently tight contact between the mold tools 1 and 2 along the overlapping bypass surfaces 8 and 8', for establishing the required molding pressure in the mold cavity gap 13 formed between the mold tools and for precise alignment and guidance of the mold tools, etc.

After the bypass cutting edges 5 and 6 shear past one another and cut-off the excess waste material of the trim component, the remaining edge portion of the main body of the trim component within the mold cavity gap 13 conventionally would have a tendency to be variably pulled-back or shrink or recede away from the cutting edge 5 upwardly into the mold cavity gap 13 as the lower mold tool 2 moves farther upwardly into the molding cavity or recess of the upper mold tool 1 to proceed with the three-dimensionally contoured molding of the trim component material. As discussed above, such a pull-back or receding of the cut edge of the trim component material (not shown or indicated in the drawings, but present in the mold cavity gap 13) is to be reduced or entirely prevented according to embodiments of the present invention. This is achieved according to the invention especially by the provision of grip-enhancing structures on one or both mold tools as follows.

Figure 1:
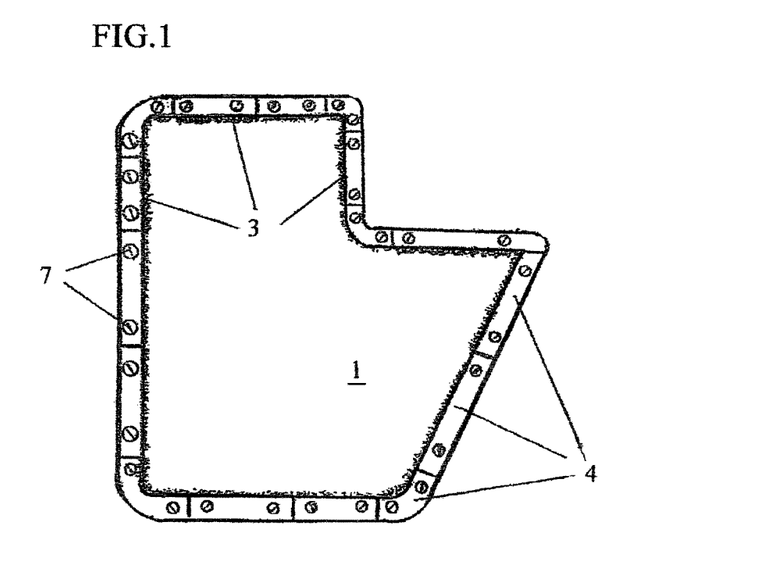
FIG. 1 is a schematic bottom plan view of an upper mold tool having, around a perimeter thereof, exchangeable mold edge segments providing a rough surface as a first embodiment of a grip-enhancing structure.

In this regard, in the embodiment shown in FIGS. 1 and 2, the grip-enhancing structures include a rough surface 3 provided on a molding surface of the upper mold tool 1 bounding an end portion of the mold cavity gap 13 in which the edge portion of the trim component material is received, as well as a rough surface 3' on a molding surface of the lower mold tool 2 bounding the end portion of the mold cavity gap 13 opposite the rough surface 3. The edge portion of the trim component material is a portion thereof adjacent to and running along, and either somewhat spaced from or terminating at, the edge of the trim component material. The end portion of the mold cavity gap 13 is the portion thereof in which the edge portion of the trim component material is received. For example, the end portion of the mold cavity gap 13 in FIG. 2 is the portion at which the rough surfaces 3 and 3' are provided, and terminates at a horizontal step wall 14 of the lower mold tool 2 adjoining the second bypass cutting edge 5. The cut edge of the trim component material is initially received and abuts against the horizontal step wall 14 at the end of the end portion of the mold cavity gap 13. An object of at least some embodiments of the invention is to maintain the cut edge of the trim component material abutting against or as close as possible to the horizontal step wall 14 at the end of the end portion of the mold cavity gap 13 throughout the entire molding process until the trim component is released from the mold.

While rough surfaces 3 and 3' are here provided on both mold tools 1 and 2 on opposite sides of the mold cavity gap 13 along the edge portion of the trim component, alternative embodiments of the invention include such a rough surface 3 or 3' or other grip-enhancing structure on only one of the mold tools 1 or 2. It is preferred in some cases to provide the grip-enhancing structure such as a rough surface 3 only on the mold tool that bounds and contacts the non-visible back side or mounting side of the substrate of the trim component, so that no marking, surface deformation, or damage of the trim component front face side will be visible in its final installed application. However, in certain applications it is advantageous to additionally or alternatively provide a rough surface 3 or 3' or other grip-enhancing structure on the mold tool that bounds the mold cavity gap 13 on the front face of the cover layer of the trim component, for example in applications in which the edge portion of the cover layer will not be visible in the final installed condition, or when the cover layer material is of such type that it will not be marked, deformed or otherwise visibly damaged by the grip-enhancing structures. For example, when the cover layer is a carpet material or a non-woven fleece material, it will generally not show any marking, deformation or damage caused by the inventive grip-enhancing structures. Also, at least some types or configurations of the inventive grip-enhancing structures will not produce any marking, deformation or visible damage on even more-sensitive cover layer materials such as leather, woven fabric, vinyl sheet material, etc. In this regard, the type, configuration, dimensioning and placement of the grip-enhancing structures is selected and adapted appropriately for the material type and configuration of the trim component being produced.

Based on another consideration, it can be preferred to provide the rough surface 3 on the upper mold tool 1, preferably to, or without, providing the rough surface 3' on the lower mold tool 2, in view of the relative motion of the mold tools. Namely, as the lower mold tool 2 moves relatively farther upwardly into the molding cavity of the upper mold tool 1, the respective juxtaposed molding surfaces of the mold tools slide past one another, as the mold tools transition from the time of bypass cutting due to contact of the bypass cutting edges 5 and 6, to the final mold closure position shown in FIG. 2. If rough surfaces 3 and 3' are provided on both molding surfaces of both mold tools, it can occur that the trim component material therebetween is subjected to a shearing action due to the rough surface 3 moving relatively downwardly and the rough surface 3' moving relatively upwardly. Simultaneously, the trim component material itself may be subjected to a shrinking or pull-back effect due to the three-dimensional contoured molding that is taking place. To counteract the shrinkage or pull-back recession of the cut edge of the trim component material, it is thus most effective in some applications to provide the rough surface 3 only on the upper mold tool 1, because the enhanced grip provided by the rough surface 3 tends to grip and hold the trim component material relatively downward along with the relative motion of the upper mold tool 1, and thereby reduce or prevent the upward pull-back motion of the edge portion of the trim component material. On the other hand, the relative upward motion of the lower mold tool 2 may even support or reinforce the upward pull-back motion of the edge portion of the trim component material, so that in such situations, it is preferred to provide a smooth non-gripping surface on the molding surface of the lower mold tool 2 opposite the grip-enhancing rough surface 3 on the molding surface of the upper mold tool 1.

Generally, depending on the material type of the trim component, the grip-enhancing structure comprising a rough surface 3 or 3' is selected to have a roughness that provides, on the material of the cover layer and/or the substrate of the trim component, an adequate enhanced friction coefficient and thus grip to reduce or prevent its pull-back or receding as the three-dimensional contoured molding proceeds by the male core or die of the lower mold tool 2 moving upwardly into the molding recess or cavity of the upper mold tool 1. Thus, preferably and ideally, the cut edge of the trim component remains positioned at or proximately adjacent to the mold step wall 14 adjoining the cutting edge 5, and does not recede or pull-back away from the area of the cutting edge 5 during the further molding process. Then, the mold tools are maintained in the closed position as shown in FIG. 2 long enough for the molded material of the trim component to be fixed in the contoured molded configuration, e.g. by cooling of thermoplastic material and/or chemical curing of thermosetting plastic material. When the mold is then opened by moving the mold tools 1 and 2 relatively apart from one another, the trim component is removed from the mold with a clean, finished, cut edge having the correct nominal or designed position and configuration without pull-back or recession of the edge away from its proper intended or designed position and dimensioning.

The upper mold tool 1 may be a unitary one-piece structure including the rough surface 3 on the main body of the mold tool. Similarly, the lower mold tool 2 may be a unitary one-piece structure including the rough surface 3' on the main body of the mold tool. Such a construction is advantageous, economical and efficient if a large number of the same trim component with the same materials is to be molded using the mold tools. Alternatively, and preferably for smaller molding production runs or greater variety of materials to be used for successive trim components, each mold tool 1 and 2 may respectively include at least two parts that bound the mold cavity gap 13, as to be described in the following.

As shown in FIG. 2, the upper mold tool 1 includes a main mold tool body 1' as well as one or more exchangeable mold edge segments 4 removably connected to the main mold tool body 1', for example by mounting bolts 7. In this regard, the rough surface 3 is provided on a side face of the exchangeable mold edge segment 4 that forms the molding surface that bounds the end portion of the mold cavity gap 13. Similarly, the lower mold tool 2 preferably comprises a main mold tool body 2' and one or more exchangeable mold edge segments 4' removably connected thereto, for example by mounting bolts (not shown). In this manner, it is possible to provide the grip-enhancing structures such as the rough surfaces 3 and 3' in a variable, selectable, exchangeable and replaceable manner, simply and economically, without needing to replace, exchange or modify the main mold tool bodies 1' and 2'. The same molding apparatus and the same main mold tool bodies 1' and 2' can be used for a given configuration of molded trim component, while different exchangeable mold edge segments 4 and/or 4' can be provided as needed for different materials of the trim component. For example, when a molding production line is to be switched to a different cover layer material of the trim component being produced (while the overall three-dimensional configuration of the trim component remains the same), it is advantageously possible to merely change the exchangeable mold edge segments 4 and/or 4' to provide different grip-enhancing structures as needed for the different cover layer material.

Furthermore, such exchangeable mold edge segments 4 and 4' make it easily and economically possible to arrange the grip-enhancing structures around the entire perimeter of the mold cavity as represented in the plan view of FIG. 1, or only at selected portions of the perimeter as needed for a particular application. Also, with such exchangeable mold edge segments 4 and 4', it is a simple matter to arrange different types or configurations of grip-enhancing structures at different locations of the perimeter, depending on the particular requirements, for example depending on the particular shrinkage or pull-back recession of the trim component material edge at different locations around the perimeter dependent on the local three-dimensional contouring or the like. In this regard, it may be necessary to provide greater grip-enhancement at some locations and lesser or no grip-enhancement at other locations along the perimeter, depending on the local shrinkage or pull-back characteristics.

While FIGS. 1 and 2 illustrate an embodiment in which the exchangeable mold edge segment 4 and/or 4' is exchangeable yet fixedly mounted on the main mold tool body 1' or 2', a further alternative embodiment of the invention (not shown) involves a separately movable tool segment that includes the grip-enhancing structure. Thereby the separate tool segment having the grip-enhancing structure is not only exchangeable, but is movably mounted on its associated main tool body so that it is movable relative to the main tool body during the molding process, for example in a direction perpendicular to the motion of the mold tools 1 and 2, in order to achieve a clamping effect on the trim component material at the appropriate time or times during the molding process while releasing the clamping pressure at other appropriate times. Also, another alternative embodiment provides one or both bypass cutting edges 5 and/or 6 on a separately movable slider that is movably connected to the main mold tool body 1' and/or 2' to be able to perform the bypass cutting operation (at least somewhat) independently of the motion of the main mold tool bodies 1' and/or 2'.

As a first example embodiment of a grip-enhancing structure described above, the rough surface 3 and/or 3' holds the edge portion of the trim component material in place and thereby prevents its shrinkage or pull-back recession by increasing the coefficient of friction of the rough surface 3 in comparison to the other areas of the molding surfaces bounding the mold cavity gap 13. Instead of or in addition to such increased friction coefficient, another embodiment of a grip-enhancing structure provides a mechanical engagement or gripping of the trim component material, for example, with a geometric configured surface 3A as shown in FIGS. 3A, 3B, 4A and 4B. For example, the geometric configured surface 3A comprises an embossed, patterned, knurled, textured, ribbed, ridged or grooved surface that provides an increased gross or macro friction effect as well as a mechanical gripping or engagement of the trim component material.

Figures 3A, 3B:
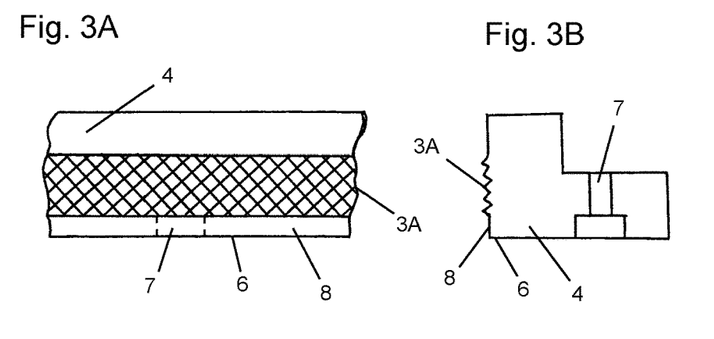
FIG. 3A is an elevation view of a portion of an exchangeable mold edge segment with a geometric configured surface and a bypass cutting edge.
FIG. 3B is a sectional view of the exchangeable mold edge segment of FIG. 3A.

FIGS. 3A and 3B show the geometric configured surface 3A on the exchangeable mold edge segment 4 of the upper mold tool 1. While not shown, it should be understood that the opposite facing surface of the lower mold tool 2, for example on an exchangeable mold edge segment 4' thereof, can similarly be provided with a geometric configured surface. In this regard, the geometric configured surface of one mold tool can be configured and positioned to mate or mesh with the geometric configured surface of the other mold tool. For example, ridges of one geometric configured surface may register and mate or mesh with grooves of the geometric configured surface on the other mold tool, and vice versa. Nonetheless, there is still a clear gap space between the highest peaks of the geometric configured surfaces on the two opposite mold tool faces in order to allow the mold tools to move relative to one another.

As a further alternative, the geometric configured surface 3A is provided on only one of the mold tools, while the opposite facing surface of the other mold tool has a typical smooth mold surface. In another alternative, a different type or configuration or dimension of grip-enhancing structure is provided on the respective opposite surfaces of the two mold tools. For example, one of the mold tools may have a geometric configured surface 3A, while the opposite facing surface of the other mold tool may have a rough surface 3 or 3'.

In this regard, the geometric configured surface 3A or opposing configured surfaces 3A also narrow the mold cavity gap 13 at the area of the edge portion of the trim component, and thereby increase the squeezing pressure applied through the trim component material at this location. This further serves to increase the grip and holding of the trim component material at this edge portion location. This reduction of the mold cavity gap space, or correspondingly the height of the protrusions of the geometric configured surface, can amount to up to 50% of the mold cavity gap 13 adjacent to the grip-enhancing structure, i.e. or similarly up to 50% of the thickness of the trim component at this location. More preferably, the height of the protrusions of the geometric configured surface, or the reduction of the mold cavity gap space, is in a range from 5 to 50%, or preferably at least 10%, or more preferably at least 20%, or especially at least 30% of the compressed trim component material thickness or mold cavity gap adjacent to the grip-enhancing structure. The particular dimensioning is selected depending on the material characteristics of the material or materials of the trim component being produced, to achieve the required degree of grip-enhancement for minimizing or preventing the shrinkage or pull-back recession of the edge of the trim component.

Figures 4A, 4B:
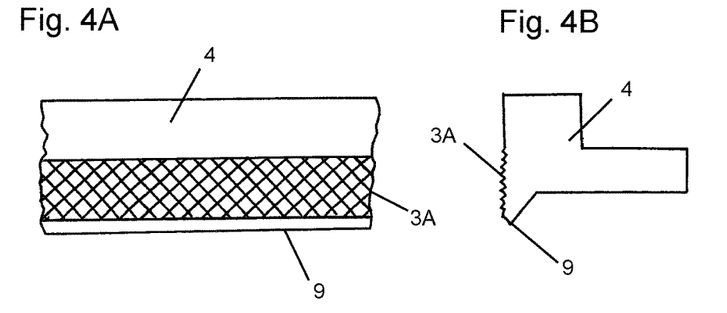
FIG. 4A is an elevation view of a portion of another embodiment of an exchangeable mold edge segment with a geometric configured surface and a pinch-cutting edge.
FIG. 4B is a sectional view of the exchangeable mold edge segment of FIG. 4A.

FIGS. 3A and 3B relate to an embodiment with bypass cutting edges 5 and 6 similar to the embodiment of FIG. 2. In such an embodiment there is a smooth overlapping bypass surface 8 and 8' provided between the rough surface 3 or the geometric configured surface 3A, and the respective bypass cutting edge 5 or 6, as shown in FIGS. 2, 3A and 3B. As described above, these smooth overlapping bypass surfaces 8 and 8' allow the mold tools to slide smoothly along one another after the bypass cutting operation to complete the three-dimensional contoured molding of the trim component material after the edge thereof has been cut-off. As a further alternative, instead of a bypass cutting arrangement, the mold tools include a stamp-cutting or pinch-cutting arrangement. For example as shown in FIGS. 4A and 4B, the exchangeable mold edge segment 4 includes a pinch edge 9 instead of the bypass cutting edge 6 described above in connection with FIGS. 2, 3A and 3B. This pinch edge 9 can be a pinch-cutting edge that stamp-cuts excess trim component material by stamping the pinch edge 9 onto a flat counter surface of the lower mold tool when the two mold tools reach their closed-mold end stop position relative to one another. Thereby the cutting occurs at the end of the molding process motion. Alternatively, the counter surface can be independently driven or spring-biased relative to the lower mold tool in order to achieve the stamp-cutting at an earlier time point before the three-dimensional contour molding motion is completed. As a further alternative, the pinch edge 9 is not a pinch-cutting edge but rather a pinch-tucking edge that does not cut-off an excess portion of the trim component material, but rather merely pinch-tucks the cover layer edge material into a slot or groove of the substrate material, for example. This demonstrates that the edge of the trim component material does not need to be cut during the molding process for the grip-enhancing structures according to the invention to have their intended effect.

Namely, even without cutting of the edge of the trim component material, the existing edge and edge portion of the trim component material are held in place and prevented from pulling back or receding during the three-dimensional contour molding, whether or not the edge of the trim component material was cut by the molding apparatus. Thus, a molding apparatus even without a bypass cutting edge 5 or 6 or a pinch edge 9 can nonetheless incorporate a grip-enhancing structure according to the invention to reduce or prevent shrinkage or pull-back receding of the edge portion of the trim component material.

Furthermore, in the embodiment of FIGS. 4A and 4B it is apparent that there is no need for a smooth overlapping bypass surface 8 between the geometric configured surface 3A and the pinch edge 9, because the mold tools do not slide or bypass along one another after the cutting or pinching operation. Thus, in any mold tool configuration in which the mold tools do not slide along one another, the smooth overlapping bypass surfaces 8 and 8' can be omitted, and instead the grip-enhancing structure can extend all the way to the edge of the perimeter of the mold tool, for example the pinch edge 9.

Figure 5:
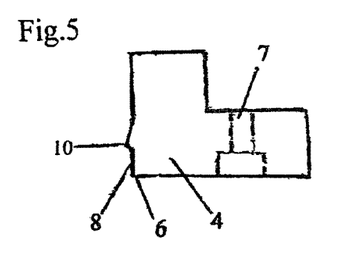
FIG. 5 is a sectional view of another embodiment of an exchangeable mold edge segment with a geometric grip edge.

FIG. 5 schematically illustrates another embodiment of a grip-enhancing structure as a geometric configured surface, and particularly, as a geometric gripping edge 10 formed as a single protruding ridge or the like extending in the perimeter direction. The protrusion height of the geometric gripping edge 10 is selected depending on the material of the trim component being produced, and depending on the degree of grip enhancement that is required. The protrusion height of the geometric gripping edge 10 can be up to 50%, or preferably in the range from 5 to 50%, or more preferably at least 10%, or at least 20%, or at least 30% of the compressed trim component material thickness, i.e. the mold cavity gap spacing at a location adjacent to the geometric gripping edge 10. Furthermore, the sectional shape of the geometric gripping edge 10 (for example as seen in the section plane of FIG. 5) can have various configurations. For example, as shown in FIG. 5, the sectional shape of the geometric gripping edge 10 can be essentially triangular, of either a symmetrical or asymmetrical configuration. Alternatively, the cross-sectional shape of the geometric gripping edge 10 may be square or rectangular, semicircular, arced, oblong curved, multi-peaked, saw-toothed, polygon-shaped, or various combinations of such shapes on two geometric gripping edges 10 provided opposite one another on the two opposite mold tools.

FIG. 5 shows the geometric gripping edge 10 provided on the exchangeable mold edge segment 4 of the upper mold 1, but such a geometric gripping edge 10 can be provided alternatively or additionally on the opposite facing molding surface of the lower mold 2. If respective geometric gripping edges 10 are provided on both mold tools, they may be arranged either aligned in registration with one another, or offset from one another in the vertical direction. The combined protrusion height of the two geometric gripping edges 10 then amounts to the preferred percentages or percentage ranges set forth above. In any event, the geometric gripping edge(s) 10 produce(s) an increased squeezing pressure and thus an increased grip on the trim component material by narrowing the mold cavity space at this location, and also somewhat by mechanically engaging the material of the trim component. Each geometric gripping edge 10 may have a continuous linear configuration, or may have a sawtooth, bumpy, notched, parapet-shaped or other repetitive pattern shape along its extension direction. FIG. 5 shows a bypass surface 8 between the geometric gripping edge 10 and the bypass cutting edge 6. It should be understood that such a geometric gripping edge 10 can alternatively be provided on a mold tool with a pinch edge 9 instead of a bypass cutting edge 6, or without any cutting edge, either with or without a smooth bypass surface 8. This is true as well for all of the other types of grip-enhancing structures.

Figure 6:
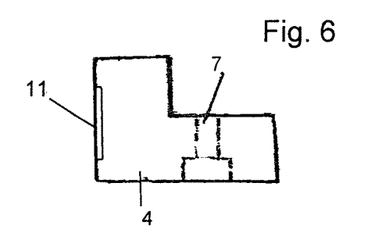
FIG. 6 is a sectional view of another embodiment of an exchangeable mold edge segment with a grip-enhancing surface coating.

FIG. 6 schematically shows a further example of a grip-enhancing structure that comprises a grip-enhancing surface coating 11 provided on the exchangeable mold edge segment 4, on the portion of the molding surface thereof that bounds the end portion of the mold cavity gap 13 in which the edge portion of the trim component is received. The grip-enhancing surface coating 11 is provided as a coating on top of the underlying metal surface of the metal body of the exchangeable mold edge segment 4, or is provided inset into a recess in the metal body of the exchangeable mold edge segment 4. Thus, the exposed surface of the grip-enhancing surface coating 11 may be flush with or protrude from the molding surface of the main body of the exchangeable mold edge segment 4. The grip-enhancing surface coating 11 consists of a material that inherently provides a greater grip, e.g. a higher coefficient of friction, than the material of the main body of the exchangeable mold edge segment 4 at an adjacent portion of the molding surface. Alternatively, the grip-enhancing surface coating 11 may be an adhesive-type surface coating that provides increased grip by an adhesive tackiness. Thus, as examples, the surface coating 11 may comprise an adhesive coating, a stick-on adhesive layer, a stick-on layer of sandpaper, other embedded grit layer, a grit coating, or other coating of high-friction material or adhesive material. The grip-enhancing structure comprising such a grip-enhancing surface coating 11 is especially advantageous for gripping smooth materials of the trim component, such as vinyl or other plastic sheet cover layer materials, natural or imitation leather, smooth substrate materials of plastic, etc.

Figure 7:
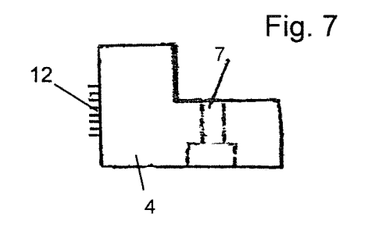
FIG. 7 is a sectional view of another embodiment of an exchangeable mold edge segment with mechanical engagement members.

FIG. 7 shows another example embodiment of a grip-enhancing structure comprising mechanical engagement members such as needles, pins or pegs 12 protruding (perpendicularly or at an oblique angle) from the molding surface of the exchangeable mold edge segment 4. The needles, pins or pegs 12 may be provided directly in the material of the main body of the exchangeable mold edge segment 4, or may be provided in a separately exchangeable insert body that is removably secured to the main body of the exchangeable mold edge segment 4. This grip-enhancing structure comprising needles, pins or pegs 12 is especially advantageous for providing an enhanced grip on various textile materials of a trim component, such as woven, non-woven, fleece or carpet materials as cover layers of trim components. The needles, pins or pegs 12 mechanically engage into the textile material without leaving any visible holes, marks or other apparent damage. The length, diameter, spacing etc. of these mechanical engagement members is selected to achieve the required grip without causing any damage of the trim component, dependent on the particular material of the trim component.

As described above, the provision of one or more grip-enhancing structures can be either continuous around the entire perimeter of the mold cavity, or at only one location or several locations of partial areas along the perimeter. In that regard, different types, configurations or dimensions of grip-enhancing structures can be provided at different perimeter locations, depending on the particular local requirements of enhanced grip in view of the shrinkage or pull-back characteristics of the trim component at each respective location, for example depending on the three-dimensional contouring to be achieved at each location. Furthermore, a combination of different types of grip-enhancing structures can be provided at any given location, for example with one type of grip-enhancing structure on one mold tool and another type of grip-enhancing structure on the opposite facing surface of the other mold tool, or two different types of grip-enhancing structures can be provided one above the other in the end portion of the molding surface of a single one of the mold tools.

Throughout the above disclosure it should be understood that references to "upper" and "lower", or "first" and "second", and the like can be respectively reversed within the scope of this invention. Namely, in effect, the drawing figures could all be turned upside down, and the operation of the molding apparatus and method would still be the same. Similarly, the molding apparatus could be operated side-to-side, e.g. as would appear by turning the drawing figures on their side by a 90 degree rotation. It should also be understood that the drawings are not intended to be drawn to any particular scale, and all of the drawing figures are not to the same scale. The drawings are merely general simplified schematic representations to highlight the inventive features. A person of ordinary skill in the art will be able to incorporate these inventive features in many different specific detailed configurations of the molding apparatus and molding method in actual practice.

The upper and lower molds being "movable relative to one another" covers various different embodiments. For example, the lower mold may be stationary (with respect to the machine frame or foundation), while the upper mold is movable up and down relative to the lower mold, or the upper mold may be stationary while the lower mold is movable up and down, or both the lower mold and the upper mold are movable up and down. Also, in the illustrated embodiment, while the molds are movable vertically up and down, these molds may instead move horizontally to the right and the left, in an arrangement in which basically FIG. 2 would be rotated by 90° counterclockwise or clockwise. The illustrated arrangement is, however, the typical and preferred arrangement.

The above described embodiments of the molding apparatus and molding method according to the invention make it possible to produce a trim component with a three-dimensionally molded configuration and a clean edge at a particular intended nominal or designed edge location, whereby variable shrinkage or pull-back of the edge during the molding process has been reduced, minimized or prevented by the inventive grip-enhancing structures provided in at least a selected portion of at least a selected one of the mold tools bounding the end portion of the mold cavity in which the edge portion of the trim component is received. The grip-enhancing structure or structures serve to hold the edge portion of the trim component and prevent the edge from receding inwardly toward the main body of the trim component as the three-dimensional contoured molding proceeds to the final mold-closed position shown in FIG. 2. At that time, the mold tools are maintained in the closed position for a sufficient time to allow the molded trim component to set or fix the three-dimensionally molded configuration thereof, e.g. by cooling thermoplastic material of the trim component or chemically curing a thermosetting plastic material of the trim component. This setting or fixing of the three-dimensionally molded configuration also serves to set or fix the position of the edge of the trim component, which has been held in place by the grip-enhancing structures, so that the final trim component removed from the mold will permanently retain the edge of the trim component at the proper intended location.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A press-molding apparatus for forming a press-molded trim component that has an edge and an edge portion adjacent to the edge, said press-molding apparatus comprising:
  a first mold tool that has a first molding surface, and a second mold tool that has a second molding surface;
  wherein the first and second mold tools are movable relative to one another to bring the first and second mold tools into a closed position with the first and second molding surfaces juxtaposed facing one another with a mold cavity formed and bounded therebetween, the mold cavity terminates and is bounded at a mold cavity end where the first and second mold tools meet one another, the mold cavity includes an end portion that terminates at and extends from the mold cavity end, and the first and second mold tools are configured and adapted to press-mold the trim component in the mold cavity with the edge portion of the trim component received in the end portion of the mold cavity; and
  wherein a selected portion of the first molding surface of the first mold tool bounding the end portion of the mold cavity has a grip-enhancing structure configured and adapted to provide, on the edge portion of the trim component, an increased grip in comparison to an adjacent portion of the first molding surface adjacent to the grip-enhancing structure, to prevent or counteract retraction of the edge of the trim component away from the mold cavity end during the press-molding of the trim component in the mold cavity.

2. The press-molding apparatus according to claim 1, wherein the grip-enhancing structure comprises a rough surface having a surface roughness greater than the adjacent portion of the first molding surface.

3. The press-molding apparatus according to claim 1, wherein the grip-enhancing structure comprises a geometric gripping edge comprising a continuous or discontinuous ridge that protrudes from the adjacent portion of the first molding surface into the end portion of the mold cavity.

4. The press-molding apparatus according to claim 1, wherein the grip-enhancing structure comprises a surface coating of a friction material having a friction coefficient greater than the adjacent portion of the first molding surface, or a surface coating of an adhesive material having an adhesion coefficient greater than the adjacent portion of the first molding surface.

5. The press-molding apparatus according to claim 1, wherein the grip-enhancing structure comprises a geometric configured surface selected from an embossed surface, a knurled surface, a grooved surface, a ribbed surface, and a textured surface.

6. The press-molding apparatus according to claim 1, wherein the grip-enhancing structure comprises a plurality of individual elongated protrusions selected from needles, pins and pegs that protrude essentially perpendicularly from the selected portion of the first molding surface.

7. The press-molding apparatus according to claim 1, wherein the grip-enhancing structure protrudes from the selected portion of the first molding surface into the mold cavity to thereby narrow a mold cavity gap at a location of the grip-enhancing structure.

8. The press-molding apparatus according to claim 1, wherein the grip-enhancing structure is configured and adapted to provide an increased surface friction or an increased adhesion on the edge portion of the trim component compared to the adjacent portion of the first molding surface.

9. The press-molding apparatus according to claim 1, wherein the grip-enhancing structure is configured and adapted to provide a mechanical engagement with the edge portion of the trim component.

10. The press-molding apparatus according to claim 1, wherein the grip-enhancing structure is provided on only the first molding surface of the first mold tool and is not provided on the second molding surface of the second mold tool.

11. The press-molding apparatus according to claim 1, wherein the grip-enhancing structure on the first molding surface of the first mold tool is a first one of the grip-enhancing structures, and a selected portion of the second molding surface of the second mold tool opposite the first grip-enhancing structure across the mold cavity has a second one of the grip-enhancing structures.

12. The press-molding apparatus according to claim 11, wherein the second grip-enhancing structure has a different configuration compared to the first grip-enhancing structure.

13. The press-molding apparatus according to claim 1, wherein the grip-enhancing structure is continuous along an entire perimeter of the mold cavity.

14. The press-molding apparatus according to claim 1, wherein the grip-enhancing structure is provided discontinuously in a perimeter direction at only one or more portions of a perimeter of the mold cavity.

15. The press-molding apparatus according to claim 1, wherein the grip-enhancing structure includes plural different structure portions that respectively have different configurations at respective portions of a perimeter of the mold cavity.

16. The press-molding apparatus according to claim 1, wherein the first mold tool further has a cutting edge configured and arranged to cut-off an extra waste portion of the trim component and thereby form the edge of the trim component as a cut edge that is received in the end portion of the mold cavity.

17. The press-molding apparatus according to claim 16, wherein the first mold tool further has a smooth bypass surface between the cutting edge and the grip-enhancing structure.

18. The press-molding apparatus according to claim 16, wherein the cutting edge directly borders on the grip-enhancing structure.

19. The press-molding apparatus according to claim 1, wherein the first mold tool comprises a mold tool body and at least one exchangeable mold edge segment releasably secured to the mold tool body, the mold tool body and the at least one exchangeable mold edge segment each respectively have a respective portion of the first molding surface, and the selected portion of the first molding surface with the grip-enhancing structure is provided on the at least one exchangeable mold edge segment.

20. The press-molding apparatus according to claim 19, wherein the at least one exchangeable mold edge segment includes plural exchangeable mold edge segments arranged respectively at plural portions of a perimeter of the mold cavity, the selected portion of the first molding surface includes plural selected sub-portions thereof respectively provided on the plural exchangeable mold edge segments, and respective ones of the grip-enhancing structure are provided respectively on the selected sub-portions of the exchangeable mold edge segments.

21. The press-molding apparatus according to claim 20, wherein the grip-enhancing structures on different ones of the exchangeable mold edge segments respectively have different configurations compared to one another.

22. A press-molding method using a press-molding apparatus to form a press-molded trim component that has an edge and an edge portion adjacent to the edge, comprising the steps:
 a) introducing at least one material layer into a space between a first molding surface of a first mold tool and a second molding surface of a second mold tool of the press-molding apparatus;
 b) moving the first and second mold tools relatively toward one another into a closed position wherein the first and second molding surfaces are juxtaposed facing one another with a mold cavity formed and bounded therebetween, thereby press-molding the at least one material layer in the mold cavity to form the press-molded trim component, wherein the mold cavity terminates and is bounded at a mold cavity end where the first and second mold tools meet one another, with the edge portion of the trim component received in an end portion of the mold cavity that terminates at and extends from the mold cavity end; and
 c) during the press-molding in the step b), holding the edge portion of the trim component to prevent or counteract retraction of the edge of the trim component away from the mold cavity end, by exerting on the edge portion of the trim component, with a grip-enhancing structure provided on a selected portion of the first molding surface of the first mold tool bounding the end portion of the mold cavity, an increased grip in comparison to an adjacent portion of the first molding surface adjacent to the grip-enhancing structure.

* * * * *